United States Patent [19]

Amacker

[11] Patent Number: 5,297,656
[45] Date of Patent: Mar. 29, 1994

[54] FIXED POSITION TREE STAND HAVING ADJUSTABLE FOOTREST

[76] Inventor: Joseph A. Amacker, 1212 Main St., Delhi, La. 71232

[21] Appl. No.: 999,166
[22] Filed: Dec. 31, 1992

Related U.S. Application Data

[63] Continuation-in-part of Ser. No. 818,120, Jan. 8, 1992.

[51] Int. Cl.⁵ ............................................. A01M 31/00
[52] U.S. Cl. ........................................ 182/187; 182/188
[58] Field of Search ............... 182/187, 188, 133–136

[56] References Cited

U.S. PATENT DOCUMENTS

| | | |
|---|---|---|
| 932,232 | 8/1909 | Adams . |
| 2,567,595 | 9/1951 | Bryant . |
| 3,067,975 | 12/1962 | Wilcox . |
| 3,115,213 | 12/1963 | Cloutier . |
| 3,340,828 | 9/1967 | Smith et al. . |
| 3,419,108 | 12/1968 | Mobbs . |
| 3,513,940 | 5/1970 | Ussery . |
| 3,871,482 | 5/1975 | Southard . |
| 4,331,216 | 5/1982 | Amacker . |
| 4,368,800 | 1/1983 | Campbell . |
| 4,369,858 | 1/1983 | Babb . |
| 4,428,459 | 1/1984 | Peck . |
| 4,458,782 | 7/1984 | Meyer . |
| 4,475,627 | 10/1984 | Eastridge . |
| 4,582,165 | 4/1986 | Latini . |
| 4,589,522 | 5/1986 | Shelton . |
| 4,600,082 | 7/1986 | Rauls . |
| 4,723,630 | 2/1988 | Wolford et al. . |
| 4,802,552 | 2/1989 | Williams . |
| 4,834,217 | 5/1989 | Manes . |
| 4,840,252 | 6/1989 | Hucks, Jr. ........................ 182/187 |
| 4,942,942 | 7/1990 | Bradley . |
| 4,995,475 | 2/1991 | Berkbuegler . |
| 4,997,063 | 3/1991 | Bradley . |
| 5,016,733 | 5/1991 | Bradley . |
| 5,090,505 | 2/1992 | Amacker ........................... 182/187 |
| 5,103,935 | 4/1992 | Amacker . |
| 5,143,176 | 9/1992 | Burdette . |
| 5,143,177 | 9/1992 | Smith ................................ 182/187 |

FOREIGN PATENT DOCUMENTS

| | | |
|---|---|---|
| 641410 | 5/1962 | Canada ............................. 182/82 |
| 264701 | 9/1913 | Fed. Rep. of Germany . |
| 904719 | 1/1954 | Fed. Rep. of Germany . |
| 2627175 | 8/1989 | France . |
| 2657021 | 7/1991 | France . |
| 2657022 | 7/1991 | France . |
| 2664822 | 1/1992 | France . |
| 8000794 | 5/1980 | World Int. Prop. O. . |

OTHER PUBLICATIONS

Amacker International Brochure p. 10 TIM-B-R-LOCK.

Primary Examiner—Alvin C. Chin-Shue
Attorney, Agent, or Firm—Wigman, Cohen, Leitner & Myers

[57] ABSTRACT

A fixed position tree stand having extendable vertical members for adjusting the height of the seat and extendable and retractable diagonal support members for adjusting the angle of the footrest.

The invention includes an inverted U-shaped tubular frame having two extendable and retractable substantially vertical arms. The U-shaped frame is hung from a T-shaped screw handle attached to a tree. The footrest is pivotally attached at the rear thereof to the extendable and retractable vertical arms. Extendable and retractable support arms are pivotally mounted diagonally between the front of the footrest to the upper end of the extendable and retractable vertical arms. The diagonal extendable and retractable support arms permit the angle or inclination of the footrest to be adjusted. Provision is made to permit incremental automatic retraction or extension of the diagonal members by the combination of a locking pin assembly and a resilient biasing member mounted on each diagonal member. A U-shaped seat front support bar is pivotally attached to the U-shaped tubular frame. A seat is formed by a seat webbing mounted between the U-shaped tubular frame and the U-shaped front support bar. The tree stand is collapsable or foldable for transport and storage by provision of removable pins between the diagonal extendable and retractable members and the vertical extendable and retractable members. The tree stand is secured to the tree by a belt or chain attached to the U-shaped tubular frame and tightened by a buckle.

24 Claims, 3 Drawing Sheets

FIXED POSITION TREE STAND HAVING ADJUSTABLE FOOTREST

BACKGROUND OF THE INVENTION

Cross-Reference to Related Application

This application is a continuation-in-part of U.S. Ser. No. 07/818,120, filed Jan. 8, 1992.

FIELD OF THE INVENTION

The present invention relates to fixed position tree stands which are fastened to the side of a tree or other upright columnar member. More particularly, the present invention relates to such tree stands which have footrests for which the distance from the seat and the angle of inclination are adjustable.

DESCRIPTION OF THE PRIOR ART

Tree stands having a fixed seat and footrest for attachment to a tree at a fixed vertical elevation have been in commercial use for a number of years. Among these are a fixed position tree stand sold by Amacker International, Inc. under the trademark "TIMB-R-LOCK". Such a tree stand is mounted on a screw-in mounting fixture or screw hanger which is T-shaped and provides a vertical mount for a tree stand to be hung on. The fixed position tree stand has a seat frame attached to a pair of vertical members. The seat frame supports a seat webbing. Disposed beneath the seat is a footrest also attached at the rear thereof to the vertical members by nut and bolt assemblies and by a pair of support cables diagonally disposed between the front of the footrest and the upper part of the vertical members. Such fixed position tree stands are popular because they are lightweight and foldable for easy transport and storage. However, the footrests are not readily adjustable for hunters having different leg lengths and desiring different inclination angles to support their feet.

SUMMARY OF THE INVENTION

The present invention overcomes the lack of height adjustability and footrest angle adjustability by providing a fixed position tree stand which has extendable and retractable vertical arms for adjusting the height of the seat and extendable and retractable diagonal support arms for adjusting the angle of inclination of the footrest.

The invention comprises an inverted U-shaped tubular frame having two extendable and retractable substantially vertical arms. The U-shaped frame is hung from a T-shaped screw handle attached to tree. A footrest is pivotally attached at the rear thereof to the extendable and retractable vertical arms. Extendable and retractable support arms are pivotally mounted diagonally between the front of the footrest to the upper end of the extendable and retractable vertical arms. The diagonal extendable and retractable support arms permit the angle of inclination of the footrest to be adjusted. Provision is made to permit incremental automatic retraction or extension of the diagonal support arms by the combination of a locking pin assembly and a resilient biasing member mounted on each diagonal support arms. A U-shaped seat front support bar is pivotally attached to the U-shaped tubular frame. A seat is formed by a seat webbing mounted between the U-shaped tubular frame and the U-shaped front support bar. The tree stand is collapsible or foldable for transport and storage by provision of removable pins between the diagonal extendable and retractable support arms and the vertical extendable and retractable arms. The tree stand, which is mounted on the tree by hanging on a T-shaped screw handle, is secured to the tree by a belt or chain attached to the U-shaped tubular frame and tightened by a buckle.

With the foregoing and other advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
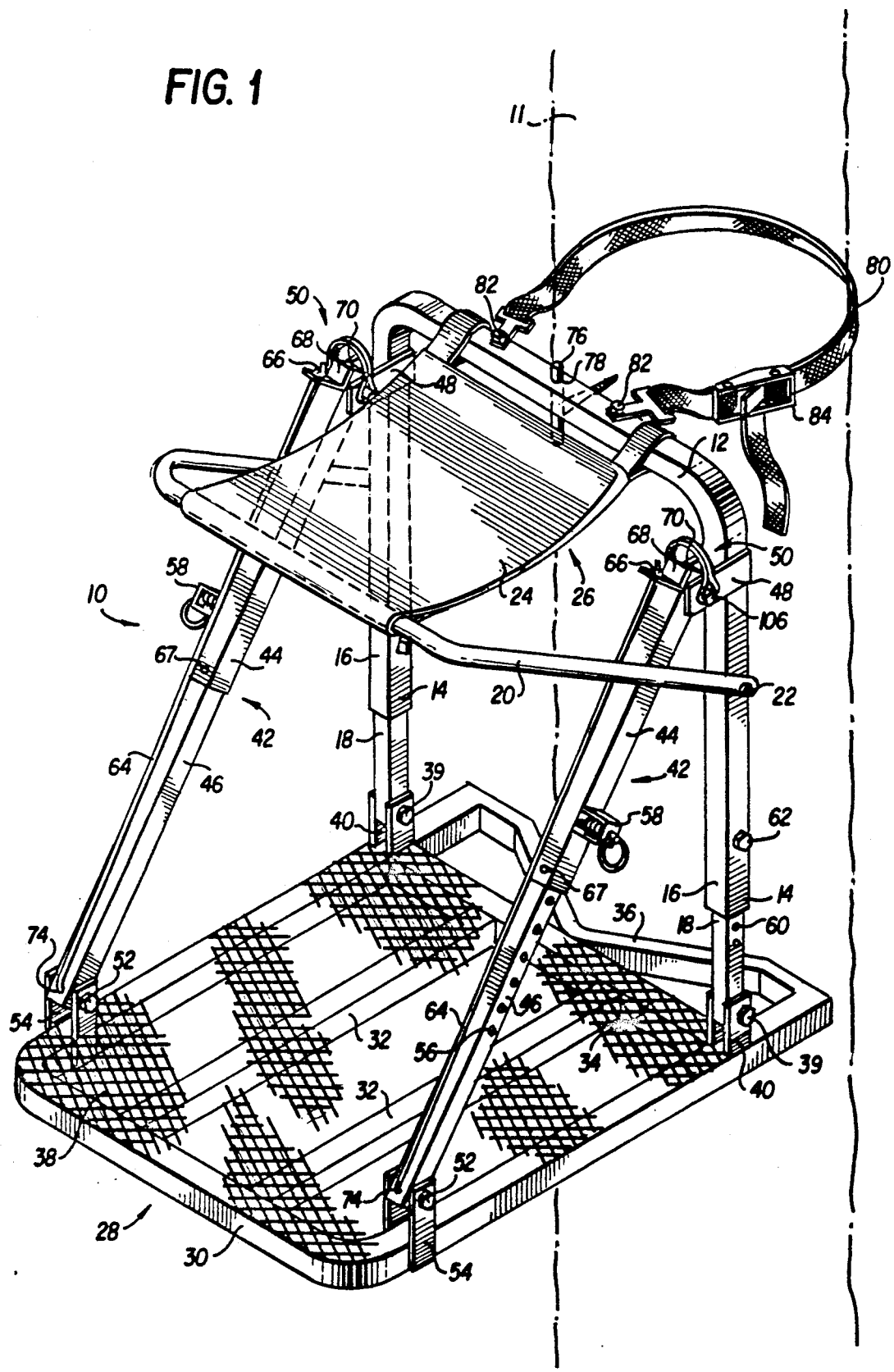
FIG. 1 is a perspective view of an embodiment of a fixed position tree stand in accordance with the present invention.

Referring now to the drawings, wherein like elements are designated by the same reference numerals, FIG. 1 shows in perspective a fixed position tree stand, designated generally by numeral 10, mounted on tree 11. Tree stand 10 is comprised of a U-shaped tubular support frame 12 having a pair of extendable and retractable support arms 14. Each extendable and retractable support arm 14 is comprised of a female sleeve 16 and a male bar 18 slidably engaged within female sleeve 16. A U-shaped seat front support bar 20 is pivotally mounted, as by pins, rivets or nut and bolt assemblies 22 to support frame 12. A seat webbing 24 is mounted between support frame 12 and front support bar 20 to form a seat 26. A footrest 28 having a footrest frame 30, support bars 32, 34, tree engaging jaw 36, and grill 38 is pivotally attached by pins or nut and bolt assemblies 39 at brackets 40 to the lower end of male bars 18 of extendable and retractable support bars 14. Diagonally-oriented extendable and retractable support members 42 are comprised of female sleeves 44 slidably engaging male bars 46. Extendable and retractable support members 42 are releasably attached at their upper ends to brackets 48 mounted on support frame 12 by releasable pins 50 and are pivotally attached by pins or nut and bolt assemblies 52 at their lower ends to brackets 54 mounted on footrest frame 30. The diagonal support members 42 have a plurality of holes 56 which are engaged by locking pin assembly 58, described hereinafter. Male bar 18 of extendable and retractable support arm 14 has a plurality of holes 60 therein which are engaged by a nut and bolt assembly or pin 62. Alternatively, holes 60 can be engaged by a locking pin assembly (not shown) similar to locking pin assembly 58.

Figure 3:
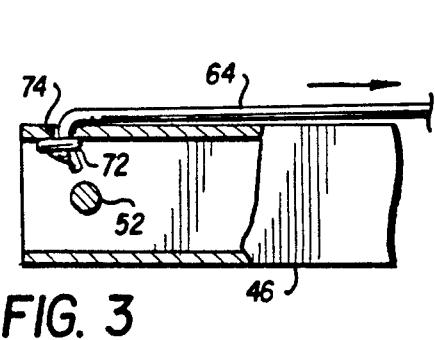
FIGS. 3 and 4 are sectional details of a resilient biasing member.

Diagonal support members 42 are provided with resilient member 64 attached at an upper end by knot 66 to clip 68 which engages open end 70 of female sleeve 44 and at a lower end by knot 72 through hole 74 in male bar 46 (see FIG. 3). Resilient member 64 is in tension and serves to bias male bar 46 within female sleeve 44. Safety button 65 (see discussion of FIG. 7, below) engages hole 67 in female sleeve 44 of diagonal support member 42 to prevent complete disengagement of male bar 46 from female sleeve 44.

The fixed position tree stand 10 is hung from a tree by a T-shaped screw handle 76 which is screwed into tree 11 and engages a hole 78 in support frame 14. The tree stand 10 is secured to the tree 11 by a belt or chain 80 which encircles the tree 11 and is attached by nut and bolt assemblies or pins 82 or other appropriate fasteners to frame 14. Belt 80 is tightened by adjustable buckle 84.

FIGS. 2-7 illustrate details of the locking pin assembly 58, releasable pin 50, resilient member 64 and safety button 65.

Figure 2:
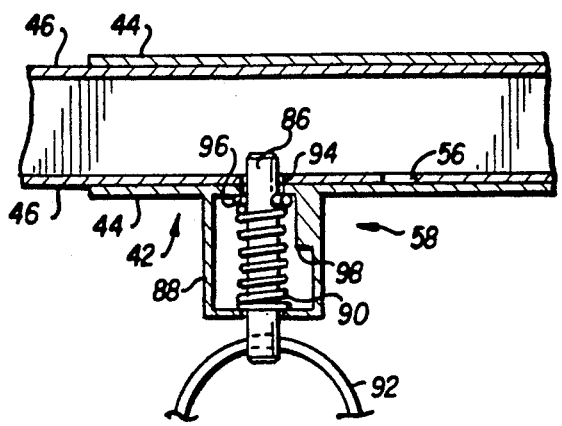
FIG. 2 is a sectional detail of a locking pin assembly.

FIG. 2 shows locking pin assembly device 58 as pin 86 engages male bar 46 and female sleeve 44 of extendable and retractable member 42. Pin housing 88 is mounted on female sleeve 44. Pin assembly 58 is comprised of pin 86 biased within pin housing 88 by spring 90. Ring 92 is attached to pin 86. Pin 86 extends through hole 94 in female sleeve 44 into one of a plurality of holes 56 in male bar 46. Pin keeper 96 extends from a lower portion of pin 86 and is designed to engage housing shoulder or block 98 when pin 86 is lifted and turned approximately 90° so as to hold pin 86 out of holes 94, 56.

Figure 4:
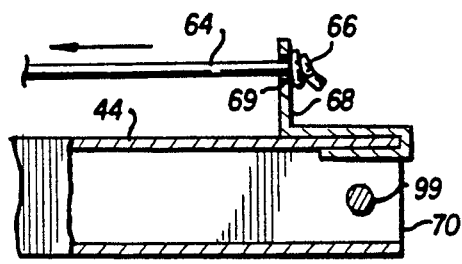
Figure 5:
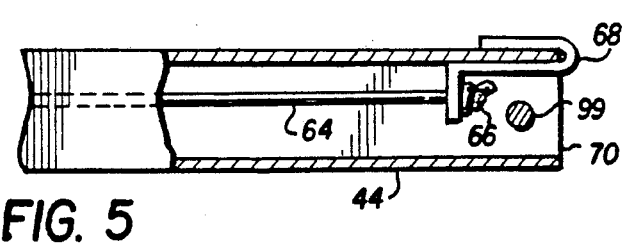
FIG. 5 is a sectional detail of an alternative resilient biasing number.

As shown in FIGS. 3 and 4, resilient member 64 is comprised of an elastic cord, or other suitable resilient material, which is fitted through a hole 74 in male bar 46 and secured by a knot 72. At the other end of cord 64, another knot 66 through hole 69 in clip 68 attaches the cord 64 to clip 68, which engages the open end 70 of female sleeve 44. Other suitable means of attaching cord 64 are contemplated. An alternative arrangement for resilient member 64 is shown in FIG. 5. Therein, resilient member 64 is captured entirely within the male bar 46 and female sleeve 44, with clip 68 engaging the open end 70 of female sleeve 44.

Figure 6:
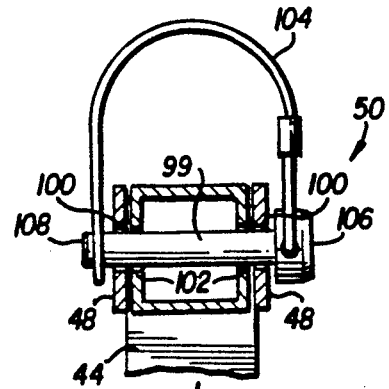
FIG. 6 is a sectional detail of a removable pin assembly.

FIG. 6 illustrates releasable or removable pin assembly 50 in which a pin 99 is fitted through a pair of holes 100 in bracket 48 and through a pair of holes 102 in extendable and retractable member 42. A U-shaped loop 104 attached to pin head 106 engages pin end 108 to hold the pin assembly 50 in place when the tree stand is extended and to store the pin assembly 50 in bracket 48 when the tree stand 10 is collapsed or folded.

Figure 7:
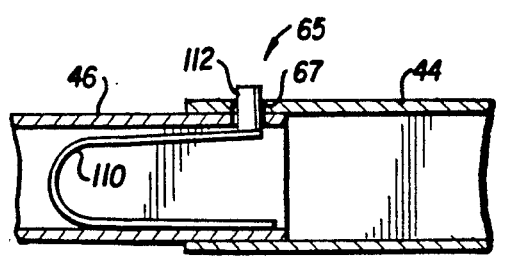
FIG. 7 is a sectional detail of a safety button.

FIG. 7 illustrates safety button 65, which includes a leaf spring 110, with a button 112 attached thereto or formed integral therewith. Leaf spring 110 is biased inside male bar 46 of extendable and retractable member 42 for engaging a hole 67 near the end of the female sleeve 44.

Figure 9:
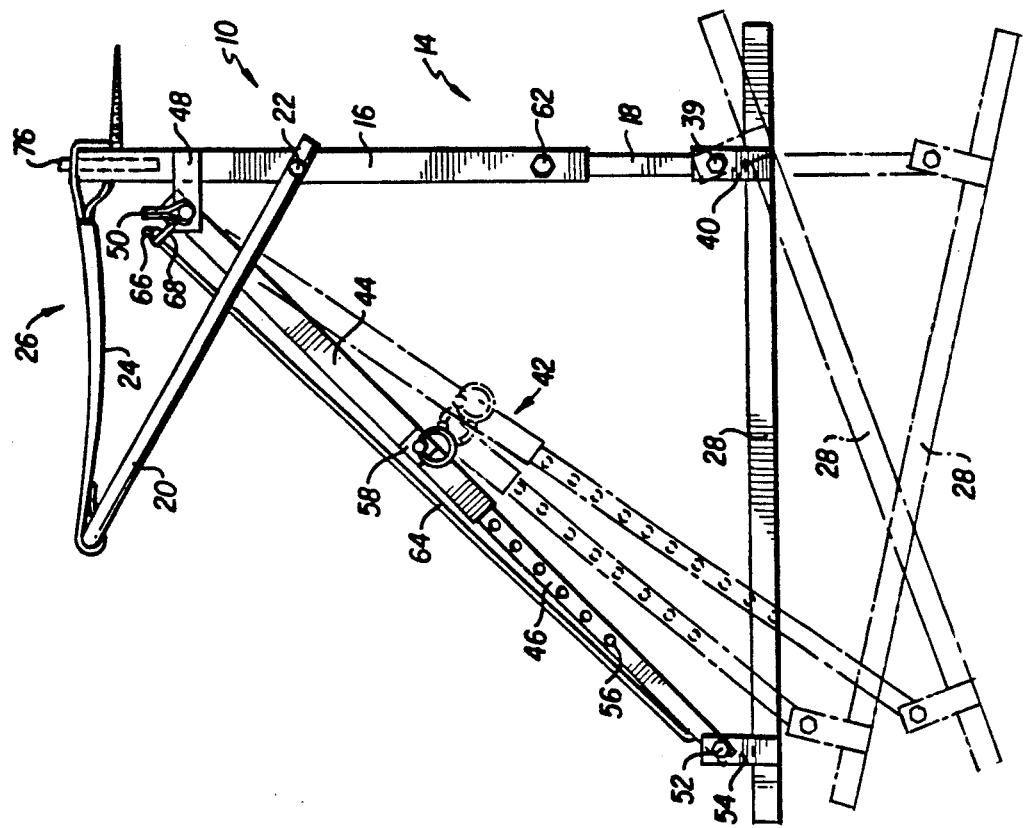
FIG. 9 is a side view of an embodiment of a tree stand according to the invention showing inclination adjustment of the footrest.
Figure 8:
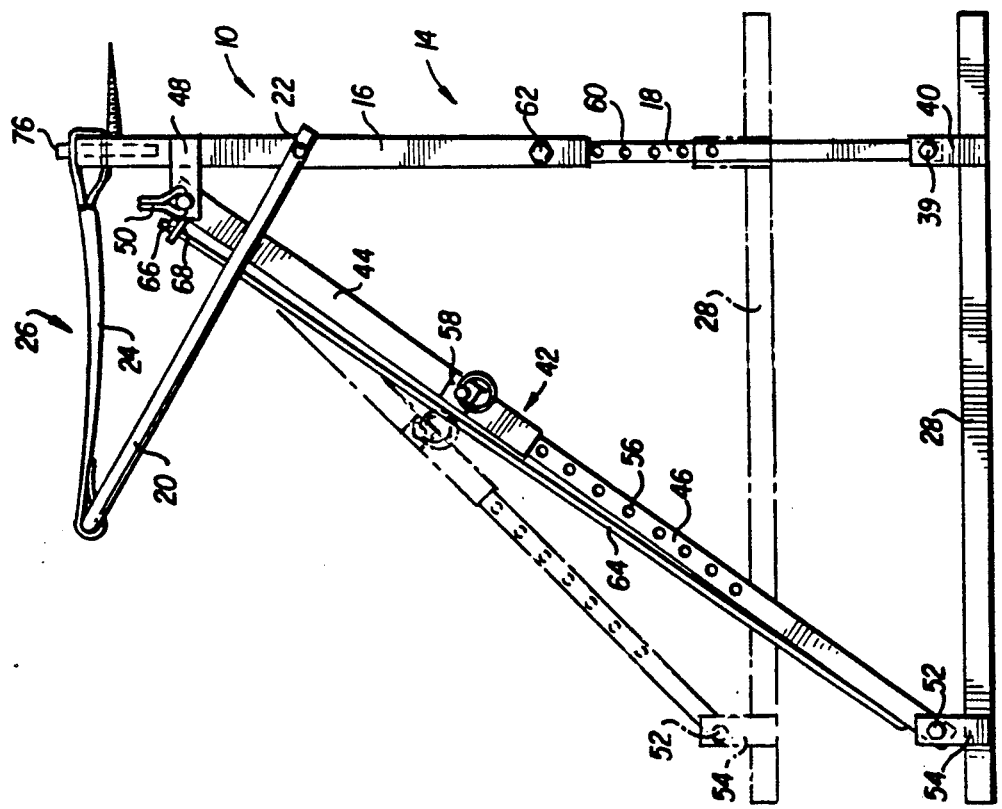
FIG. 8 is a side view of an embodiment of a tree stand according to the invention showing height adjustment of the footrest relative to the seat.

FIGS. 8 and 9 illustrate the adjustment of the height and angle, respectively of the footrest 28 relative to the seat 26. FIG. 8 shows the tree stand 10 in extended position in solid lines and in retracted position in phantom. FIG. 9 shows the footrest 28 in horizontal position with a tilted or inclined orientation shown in phantom. To alter the height of the tree stand 10, locking pin assemblies 58 on diagonal members 42 are disengaged, as discussed above. Nut and bolt assemblies 62 are removed from extendable and retractable support arms 14. The user then presses downward or pulls upward on the footrest 28. The extendable and retractable support arms 14, 42 either extend or retract and the height is adjusted, as shown. When the desired height is achieved, the locking pin assemblies 58 are reengaged in diagonal support members 42 and nut and bolt assemblies 62 are reengaged in extendable and retractable support arms 14. Although not shown, instead of nut and bolt assemblies 62, a safety button can be used to engage holes in arms 14, to prevent unintentional or accidental complete disassembly, with incremental height adjustment provided by a pair of locking pin assemblies.

Similarly, to adjust the angle of inclination of the footrest 28, only the locking pin assemblies 58 are disengaged, with the extendable support arm 14 lengths maintained by keeping nut and bolt assemblies 62 engaged. The footrest 28 front is pressed downward to extend the diagonal support members 42, thereby pivoting the footrest downward. To pivot the front upward, the front of the footrest 28 is pulled upward by the biasing force of resilient member 64, retracting the extendable and retractable diagonal support members 42.

The above-described apparatus provides a simple, lightweight, readily storable and transportable fixed position tree stand which is adjustable to accommodate users of different heights and to provide comfort in use by providing an adjustable footrest.

Although a certain presently preferred embodiment of the invention has been described herein, it will be apparent to those skill in the art to which the invention pertains that variations and modifications of the described embodiment may be made without departing from the spirit and scope of the invention. Accordingly it is intended that the invention by limited only to the extent required by the appended claims and the applicable rules of law.

What is claimed is:
1. A fixed position tree stand comprising:
  a vertically extendable and retractable frame for mounting the tree stand to a tree;
  a seat mounted to said frame;
  a footrest pivotally attached to said extendable and retractable frame; and
  at least one extendable and retractable support member diagonally disposed between and pivotally connected to said frame and said footrest, wherein said footrest is pivotally mounted relative to said extendable and retractable support member, such that height and inclination of said footrest may be adjusted by cooperation of said extendable end retractable frame and said extendable and retractable support member.

2. A tree stand as in claim 1, wherein said extendable and retractable support member comprises a male bar received inside a female sleeve and is incrementally adjustable in length by a locking pin assembly mounted thereon.

3. A tree stand as in claim 1, wherein said extendable and retractable member is automatically adjustable in length by a resilient biasing member releasably mounted externally thereon.

4. A tree stand as in claim 2, wherein said extendable and retractable support member is automatically adjustable in length by a resilient biasing member releasably mounted externally thereon.

5. A tree stand as in claim 1, wherein said seat is pivotally mounted on said frame.

6. A tree stand as in claim 1, wherein a pair of said extendable and retractable members are provided.

7. A tree stand as in claim 2, wherein a pair of said extendable and retractable members are provided.

8. A tree stand as in claim 3, wherein a pair of said extendable and retractable members are provided.

9. A tree stand as in claim 1, wherein said extendable and retractable member is telescoping.

10. A tree stand as in claim 2, wherein said extendable and retractable member is telescoping.

11. A tree stand as in claim 3, wherein said extendable and retractable member is telescoping.

12. A tree stand as in claim 2, wherein said locking pin assembly includes a spring biased pin which unlatches said extendable and retractable support member when pulled outward and which locks said extendable and retractable support member when released.

13. A tree stand as in claim 4, wherein said locking pin assembly includes a spring biased pin which unlatches said extendable and retractable support member when pulled outward and which locks said extendable and retractable support member when released.

14. A tree stand as in claim 2, wherein said locking pin assembly include a spring biased pin which unlatches said extendable and retractable support member when pulled outward and which locks said extendable and retractable support member when released.

15. A tree stand as in claim 4, wherein said resilient biasing member is disposed external to said female sleeve and said male bar.

16. A tree stand as in claim 4 wherein said resilient member is an elastic cord attached between a female portion of said extendable and retractable member and a male portion of said extendable and retractable member.

17. A tree stand as in claim 1, further comprising a spring-biased safety button disposed within said extendable and retractable support member so as to prevent unintentional disassembly of said extendable and retractable support member.

18. A tree stand as in claim 2, further comprising a spring-biased safety button disposed within said extendable and retractable support member so as to prevent unintentional disassembly of said extendable and retractable support member.

19. A tree stand as in claim 3, further comprising a spring-biased safety button disposed within said extendable and retractable support member so as to prevent unintentional disassembly of said extendable and retractable support member.

20. A tree stand as in claim 1, wherein said extendable and retractable frame comprise a pair of arms, each arm including a first member slidably engaging a second member.

21. A tree stand as in claim 20, wherein said extendable and retractable frame is telescoping.

22. A tree stand as in claim 1, wherein said frame is hung from a tree by a T-shaped screw mounted on said tree and secured by a bolt encircling said tree.

23. A tree stand as in claim 2, wherein said frame is hung from a tree by a T-shaped screw mounted on said tree and secured by a belt encircling said tree.

24. A tree stand as in claim 3, wherein said frame is hung from a tree by a T-shaped screw mounted on said tree and secured by a belt encircling said tree.

* * * * *